US008621388B2

(12) United States Patent
Tomita et al.

(10) Patent No.: US 8,621,388 B2
(45) Date of Patent: Dec. 31, 2013

(54) IMAGE FORMING APPARATUS FOR DISPLAYING INFORMATION ON SCREEN

(75) Inventors: Atsushi Tomita, Toyohashi (JP);
Ryosuke Nishimura, Toyokawa (JP);
Kenichi Sawada, Toyohashi (JP);
Takatsugu Kuno, Toyokawa (JP);
Masahiro Imamura, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 94 days.

(21) Appl. No.: 13/241,323

(22) Filed: Sep. 23, 2011

(65) Prior Publication Data
US 2012/0075311 A1 Mar. 29, 2012

(30) Foreign Application Priority Data
Sep. 29, 2010 (JP) ................................. 2010-218683

(51) Int. Cl.
*G06F 3/048* (2013.01)

(52) U.S. Cl.
USPC .......................................... 715/808; 345/473

(58) Field of Classification Search
None
See application file for complete search history.

(56) References Cited

U.S. PATENT DOCUMENTS

| 6,728,499 | B2* | 4/2004 | Ushio et al. ..................... 399/75 |
| 2001/0043249 | A1* | 11/2001 | Tabuchi ........................... 347/22 |
| 2006/0210289 | A1* | 9/2006 | Yamauchi et al. ............... 399/38 |
| 2007/0019225 | A1* | 1/2007 | Digby ........................... 358/1.14 |
| 2007/0075990 | A1* | 4/2007 | Sahashi et al. ................ 345/181 |
| 2008/0316531 | A1* | 12/2008 | Suzuki et al. ................ 358/1.15 |
| 2009/0080019 | A1* | 3/2009 | Teshima ....................... 358/1.15 |
| 2010/0007910 | A1* | 1/2010 | Martin et al. ................ 358/1.15 |
| 2010/0188698 | A1* | 7/2010 | Koizumi ...................... 358/1.15 |

FOREIGN PATENT DOCUMENTS

| JP | 05-319267 A | 12/1993 |
| JP | 09-190316 A | 7/1997 |
| JP | 10-154127 A | 6/1998 |
| JP | 11-099729 A | 4/1999 |
| JP | 2000-020197 A | 1/2000 |
| JP | 2003-152937 A | 5/2003 |
| JP | 2004-104263 A | 4/2004 |
| JP | 2005-014247 A | 1/2005 |
| JP | 2010-079121 A | 4/2010 |

OTHER PUBLICATIONS

Office Action (Decision to Grant Patent) dated Sep. 11, 2012, issued in corresponding Japanese Patent Application No. 2010-218683, and an English Translation thereof. (6 pages).

* cited by examiner

*Primary Examiner* — Xiao M. Wu
*Assistant Examiner* — Greg Raburn
(74) *Attorney, Agent, or Firm* — Buchanan Ingersoll & Rooney PC

(57) ABSTRACT

An image forming apparatus includes an operation panel serving as a display apparatus and an input apparatus for accepting a request for performing processing and a control unit for controlling display on the operation panel. The control unit performs determination processing for determining whether a time period required for the processing requested to be performed is predictable or not, provides animation display by continuously displaying two or more windows relating to the processing when it is determined that the time period required for the processing is predictable, and provides pop-up display by displaying one window relating to the processing when it is determined that the time period required for the processing is not predictable.

9 Claims, 14 Drawing Sheets

IMAGE FORMING APPARATUS FOR DISPLAYING INFORMATION ON SCREEN

This application is based on Japanese Patent Application No. 2010-218683 filed with the Japan Patent Office on Sep. 29, 2010, the entire content of which is hereby incorporated by reference.

BACKGROUND OF THE INVENTION

1. Field of the Invention

The present invention relates to an image forming apparatus, a display method, and a recording medium recording a display program, and particularly to an image forming apparatus for displaying information on a screen, a display method, and a recording medium recording a display program.

2. Description of the Related Art

An image forming apparatus representing a copier, a printer, a facsimile transmission and reception machine, an MFP (Multi-Functional Peripheral) having functions of the former as combined, and the like has such a display portion as an operation panel for presenting information to a user. Then, the image forming apparatus uses the display portion to provide presentation of an operation screen, notification or the like.

For example, an image forming apparatus disclosed in Japanese Laid-Open Patent Publication No. 2004-104263 includes a document scan-again key. In the image forming apparatus, when the key is pressed to enter a scan-again mode, a pop-up screen for scanning a document again is displayed on an operation panel so that entry into that mode is notified (for example, FIG. 4).

Alternatively, by way of another example of notification, when a user's operation input is not accepted during processing in an image forming apparatus, a message box notifying the user of that fact may be displayed on an operation panel.

As exemplified in the publication above, however, when a pop-up screen is displayed at the time of switching between the modes, the pop-up screen is suddenly displayed on the operation panel during the user's operation. Consequently, the user's smooth operational feeling or usability may be impaired.

Meanwhile, the user cannot know how long he/she should wait until an operation input is accepted, simply based on display of the message box indicating that the user's operation input is not accepted. Therefore, the user's smooth operational feeling or usability may again be impaired.

SUMMARY OF THE INVENTION

The present invention was made in view of such problems. An object of the present invention is to provide an image forming apparatus capable of displaying information on a screen without impairing user's operational feeling or usability and allowing the user's smooth and comfortable operation, a display method in the image forming apparatus, and a computer-readable recording medium recording a display program for causing the image forming apparatus to provide display.

In order to achieve the object above, according to one aspect of the present invention, an image forming apparatus includes a display apparatus, an input apparatus for accepting a request for performing processing, and a control device for controlling display on the display apparatus. The control device performs determination processing for determining whether a time period required for the processing requested to be performed is predictable or not, further performs first display processing for providing animation display by continuously displaying two or more windows relating to the processing requested to be performed on the display apparatus when it is determined in the determination processing that the time period required for the processing requested to be performed is predictable, and further performs second display processing for providing pop-up display by displaying one window relating to the processing requested to be performed on the display apparatus when it is determined in the determination processing that the time period required for the processing requested to be performed is not predictable.

Preferably, the control device performs the second display processing when it is determined in the determination processing that the time period required for the processing requested to be performed is not predictable and when the processing requested to be performed does not end after lapse of a first time period since start of the processing requested to be performed.

Preferably, the control device performs the first display processing when it is determined in the determination processing that the time period required for the processing requested to be performed is predictable and when the predicted time period required for the processing requested to be performed is longer than a second time period.

Preferably, in the first display processing, the control device provides animation display for a first time period when the time period required for the processing requested to be performed is equal to or longer than a third time period and provides animation display for a second time period shorter than the first time period when the time period required for the processing requested to be performed is shorter than the third time period.

Preferably, the control device calculates in the determination processing, the time period required for the processing requested to be performed, based on the number of pieces of stored data used for the processing requested to be performed.

Preferably, in the determination processing, the control device determines that the time period required is predictable when only data in the image forming apparatus is used in the processing requested to be performed, and determines that the time period required is not predictable when data in another apparatus outside the image forming apparatus is used.

According to another aspect of the present invention, a display method is a display method in an image forming apparatus including a display apparatus, and it includes the steps of accepting a request for performing processing, determining whether a time period required for the processing requested to be performed is predictable or not, and displaying on the display apparatus, a window relating to the processing requested to be performed in animation display in which two or more windows are continuously displayed when the time period required for the processing requested to be performed is predictable and in pop-up display in which one window is displayed when the time period required is not predictable.

According to yet another aspect of the present invention, a recording medium is a computer-readable recording medium recording a program for causing an image forming apparatus including a display apparatus to perform display processing. The program causes the image forming apparatus to perform the steps of accepting a request for performing processing, determining whether a time period required for the processing requested to be performed is predictable or not, and displaying on the display apparatus, a window relating to the processing requested to be performed in animation display in which two or more windows are continuously displayed when the time period required for the processing requested to be performed is predictable and in pop-up display in which one window is displayed when the time period required is not predictable.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
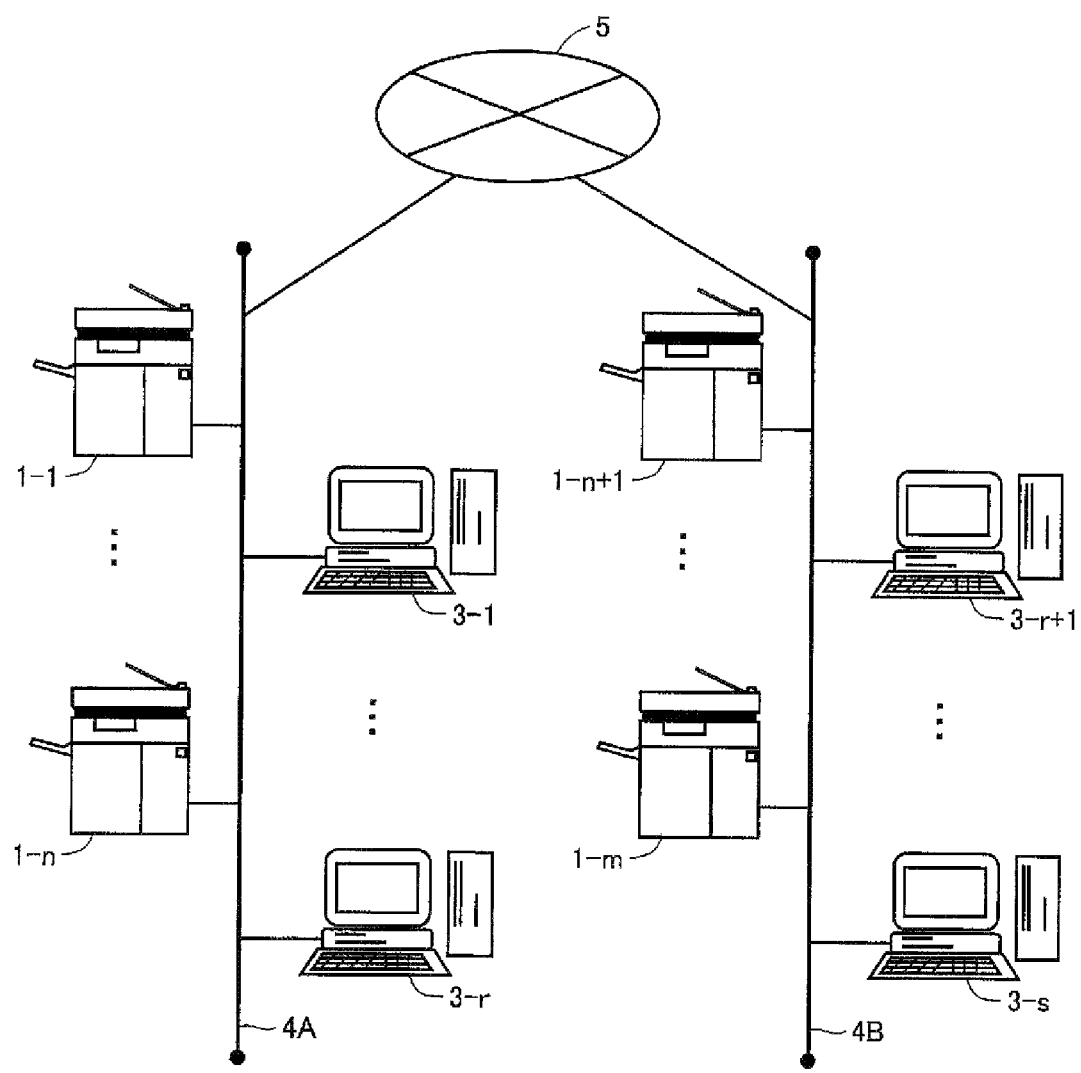
FIG. 1 is a diagram showing a specific example of a configuration of a system including an image forming apparatus according to an embodiment.

An embodiment of the present invention will be described hereinafter with reference to the drawings. In the description below, the same parts and components have the same reference characters allotted and their label and function are also identical.

<System Configuration>

FIG. 1 is a diagram showing a specific example of a configuration of a system including an image forming apparatus (hereinafter abbreviated as the system) according to the present embodiment.

Referring to the figure, the system according to the present embodiment includes an image forming apparatus 1 connected to a network 4 and an information processing apparatus 3.

As shown in the figure, a plurality of image forming apparatuses 1 may be included. A plurality of image forming apparatuses 1-$x$ ($x$=1 to n, n+1 to m) are representatively referred to as image forming apparatus 1. In addition, as shown in the figure, a plurality of information processing apparatuses 3 may also be included. A plurality of information processing apparatuses 3-$y$ ($y$=1 to r, r+1 to s) are representatively referred to as information processing apparatus 3. Moreover, as shown in FIG. 1, these may be connected to different networks 4A, 4B (representatively referred to as network 4) connected to an external network 5.

Network 4 may be any of a network using a private line such as LAN (Local Area Network), a network using a public line, a network through wireless communication, and the like. This is also the case with external network 5.

The image forming apparatus includes a copier, a printer, a facsimile transmission and reception machine, an MFP (Multi-Functional Peripheral) having functions of the former as combined, and the like. In the present example, an MFP is assumed as image forming apparatus 1. Image forming apparatus 1 forms an image on a sheet of paper based on a scanned document image or print data transmitted from information processing apparatus 3. Here, print data refers to data in a page description language obtained in such a manner that a printer driver converts data processed by an application program of information processing apparatus 3 into a page description language that can be processed by image forming apparatus 1 or document data described in such file formats as PDF (Potable Document Format), TIFF (Tagged Image File Format), JPEG (Joint Photographic Experts Group), XPS (XML Paper Specification), and the like.

Image forming apparatus 1 can also transmit image data obtained by scanning a document image to information processing apparatus 3 or another image forming apparatus through network 4. Alternatively, it can also transmit image data to another image forming apparatus or an information processing apparatus connected to another network through external network 5.

<Configuration of Information Processing Apparatus>

An information processing apparatus includes an apparatus capable of communicating with image forming apparatus 1, such as a personal computer (hereinafter a PC) and a portable telephone. In the present example, a general PC is assumed as information processing apparatus 3. Information processing apparatus 3 which is a general PC has a CPU (Central Processing Unit) for overall control of the apparatus and a RAM (Random Access Memory) serving as storage means. A fixed storage device (such as a hard disc device), a monitor for presenting information, a keyboard or a mouse for accepting a user's operation input, and the like are connected to information processing apparatus 3. Information processing apparatus 3 accepts a user's operation, generates print data in response to the operation, and transmits the generated print data to image forming apparatus 1.

<Apparatus Configuration of Image Forming Apparatus>

Figure 2:
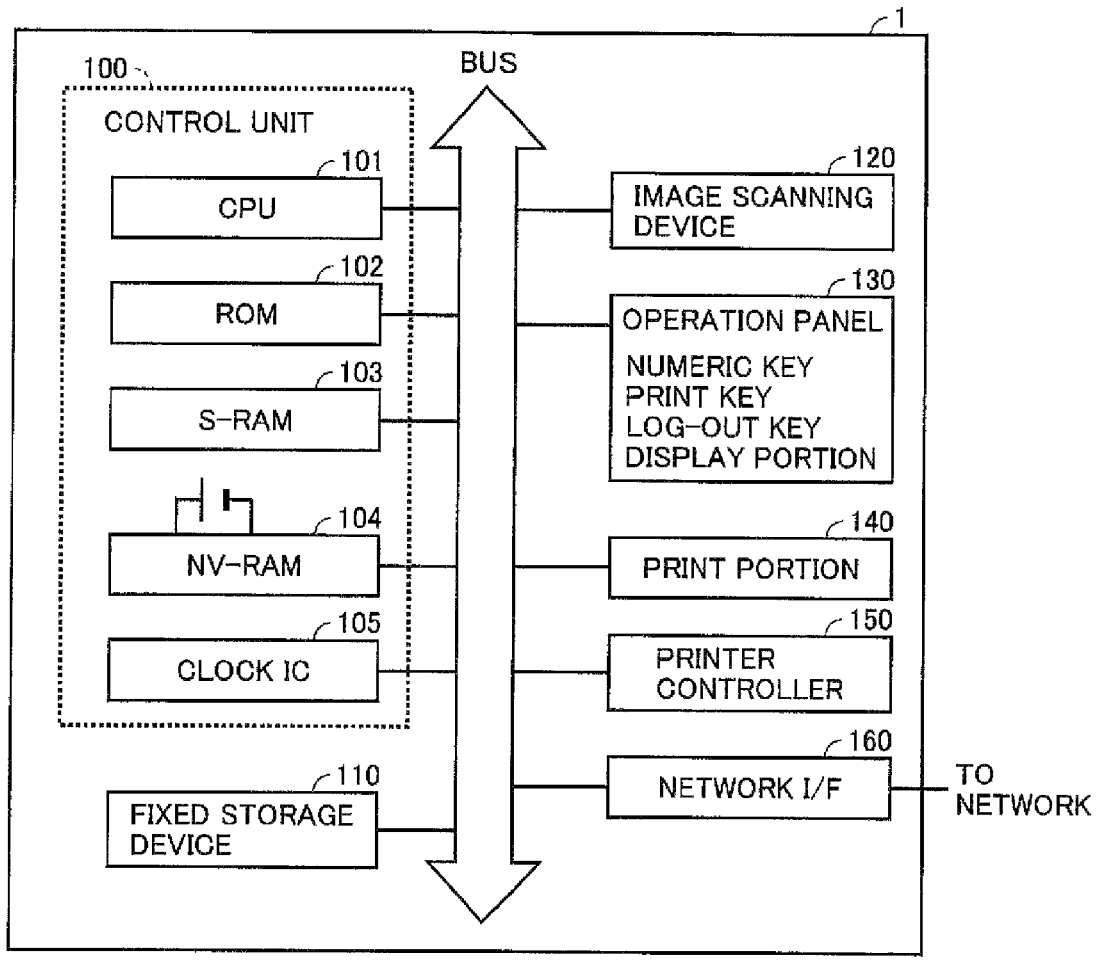
FIG. 2 is a block diagram showing a specific example of a configuration of the image forming apparatus included in the system in FIG. 1.

FIG. 2 is a block diagram showing a specific example of a configuration of image forming apparatus 1.

Referring to the figure, image forming apparatus 1 includes a control unit 100 for overall control of the apparatus, a fixed storage device 110 which is a storage device, an image scanning device 120 for optically scanning a document image to obtain image data, an operation panel 130 for displaying information to a user and accepting a user's operation, a printer controller 150 for generating image data based on the print data received from information processing apparatus 3, a print portion 140 for forming image data obtained by image scanning device 120 or image data generated by printer controller 150 on a sheet of paper, and a network interface (hereinafter I/F) 160 connected to network 4 to communicate with another apparatus such as information processing apparatus 3 or the like.

Further, control unit 100 includes a CPU 101, a ROM (Read Only Memory) 102 which is a memory for storing a control program, an S-RAM (Static Random Access Memory) 103 which is a work memory, an NV-RAM (non-volatile memory) 104 which is a memory backed up by a battery for storing various settings relating to image formation, and a clock IC (integrated Circuit) 105 which is a circuit for counting time. These are connected through a bus.

<Functional Configuration of Image Forming Apparatus>

Figure 9:
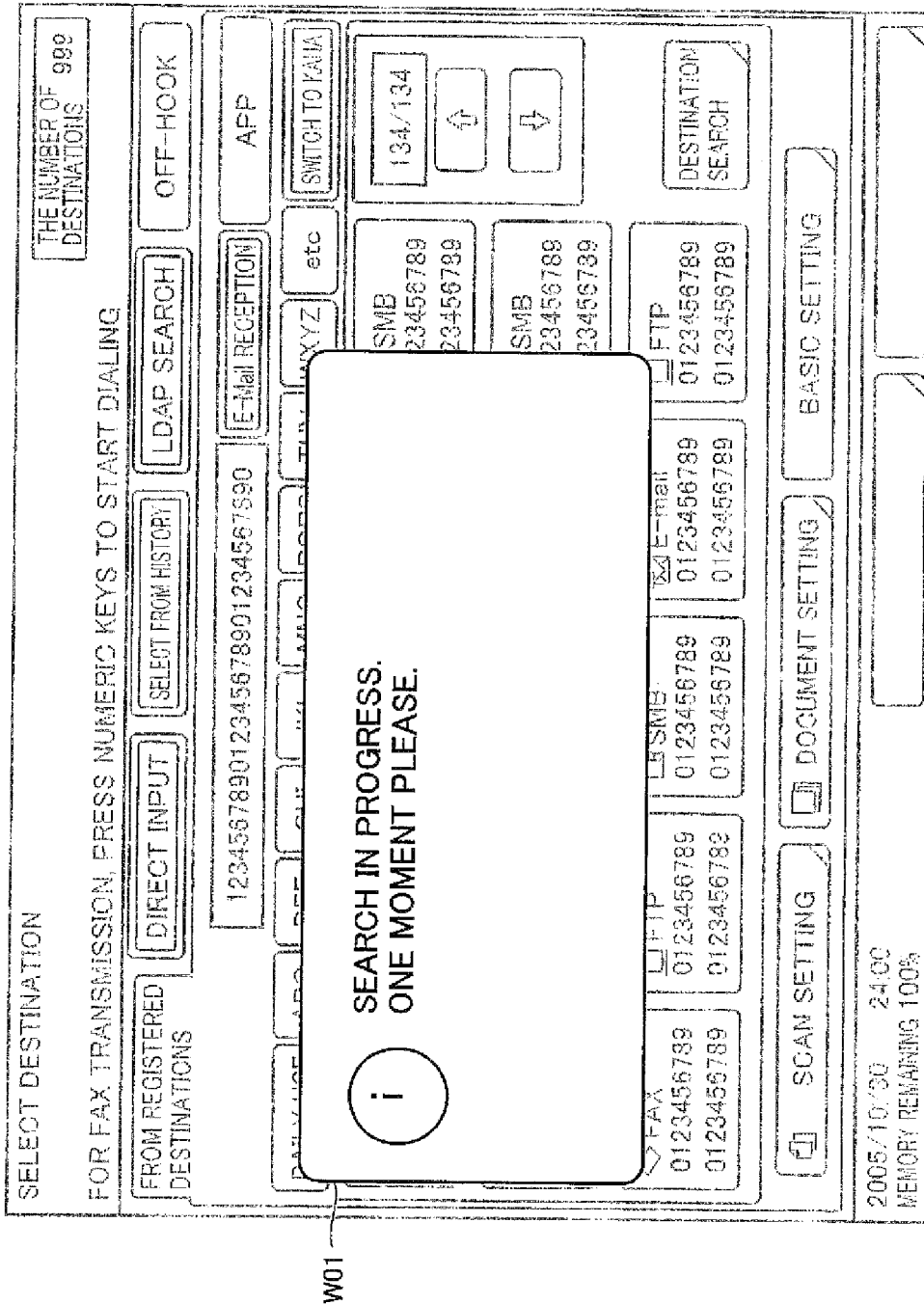
FIG. 9 is a diagram showing a specific example of a screen providing pop-up display.

Image forming apparatus 1 has two methods as methods for displaying a new image as shown as W01 in FIG. 9 on operation panel 130 (such an image as W01 in FIG. 9 being also referred to as a window). One is a method for continuously displaying two or more images including a finally displayed window, and another is a direct display method. In the description below, display with the former method is referred to as "animation display", and display with the latter method is referred to as pop-up display.

In animation display, windows based on two or more pieces of image data prepared in advance and including image data corresponding to a window to finally be displayed are displayed in the order defined in advance. Thus, in animation display, the view is as if windows were dynamically varying (animation). It is noted that a set of two or more pieces of image data above prepared for animation display is also referred to as an image data group.

On the other hand, in pop-up display, based on a single piece of image data, a window corresponding to that image data is directly displayed.

In image forming apparatus 1, when to employ animation display and when to employ pop-up display are defined in advance. Specifically, in displaying a window relating to processing requiring some time from the time point of acceptance of a user's operation until the end of the processing corresponding thereto, animation display is employed. By doing so, the user can know that it takes some time until processing ends as compared with a case of pop-up display, and uncomfortable feeling in waiting for the end of processing can be lessened. Therefore, the user's operational feeling or usability is not impaired as compared with notification only by pop-up display and a smooth operation can be achieved.

In addition, even in a case of processing for which use of animation display has been defined in advance, if a time period required until the processing ends (hereinafter may simply be referred to as the "time period required for processing") is unpredictable, image forming apparatus 1 does not employ animation display but employs pop-up display. Thus, interruption of animation display due to a short time period required for processing is prevented.

Here, the phrase that "a time period required for processing is predictable" means that the time period required for processing can be calculated at the time of start of the processing. Specifically, in a case where the entire data to be processed is stored in image totaling apparatus 1, the time period required for processing is "predictable". On the other hand, a part or entirety of data to be processed is stored in an apparatus other than image forming apparatus 1, the time period required for processing is "unpredictable", because, if data to be processed is stored in another apparatus, the time period required for processing is dependent on such factors as a data management condition in another apparatus (the number of pieces of stored data, each location, and the like), a condition of processing load of another apparatus, and communication traffic for access to another apparatus. Then, these factors cannot be controlled by the apparatus itself (image forming apparatus 1). Thus, image forming apparatus 1 switches between animation display and pop-up display for displaying processing of data, depending on whether the entire data to be processed is stored in image forming apparatus 1 or a part or entirety of data to be processed is stored in an apparatus other than image forming apparatus 1.

Figure 3:
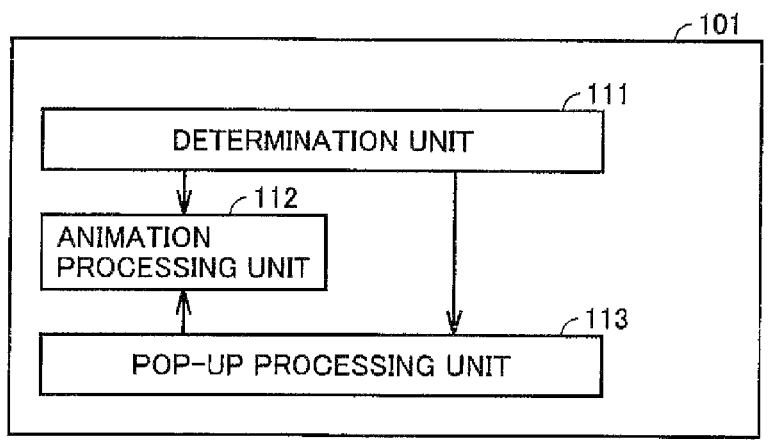
FIG. 3 is a block diagram showing a specific example of a functional configuration of the image forming apparatus.

FIG. 3 is a block diagram showing a functional configuration of image forming apparatus 1 for realizing display control described previously. Each function is mainly implemented by CPU 101 reading and executing a program stored in ROM 102.

Referring to the figure, CPU 101 includes a determination unit 111 for determining whether to employ animation display or pop-up display in displaying a window relating to processing performed by image forming apparatus 1, an animation processing unit 112 for storing an image data group for animation display to perform processing for animation display, and a pop-up processing unit 113 for storing image data for pop-up display to perform processing for pop-up display.

Determination unit 111 determines in two stages whether to employ animation display or pop-up display as a window display method, for each processing that can be performed by image forming apparatus 1, as follows.

Determination unit 111 stores in advance a table in which whether to employ animation display or pop-up display is defined (a display method table) for each processing that can be performed by image forming apparatus 1.

Then, in the first stage, determination unit 111 determines a window display method based on the display method table.

Then, in the second stage, when it is determined in the first stage that animation display is to be employed, determination unit 111 determines a final window display method based on whether the time period required for processing is predictable or not, as will be described further later, for processing defined in the display method table to employ animation display.

When determination unit 111 finally determines to employ animation display, animation processing unit 112 reads image data included in the image data group in the order defined in advance and performs processing for successively displaying windows in accordance with the image data on operation panel 130.

When determination unit 111 finally determines to employ pop-up display, pop-up processing portion 113 reads image data and performs processing for displaying a window based on the image data on operation panel 130.

<Processing in Image Forming Apparatus>

(Overall Processing)

Figure 4:
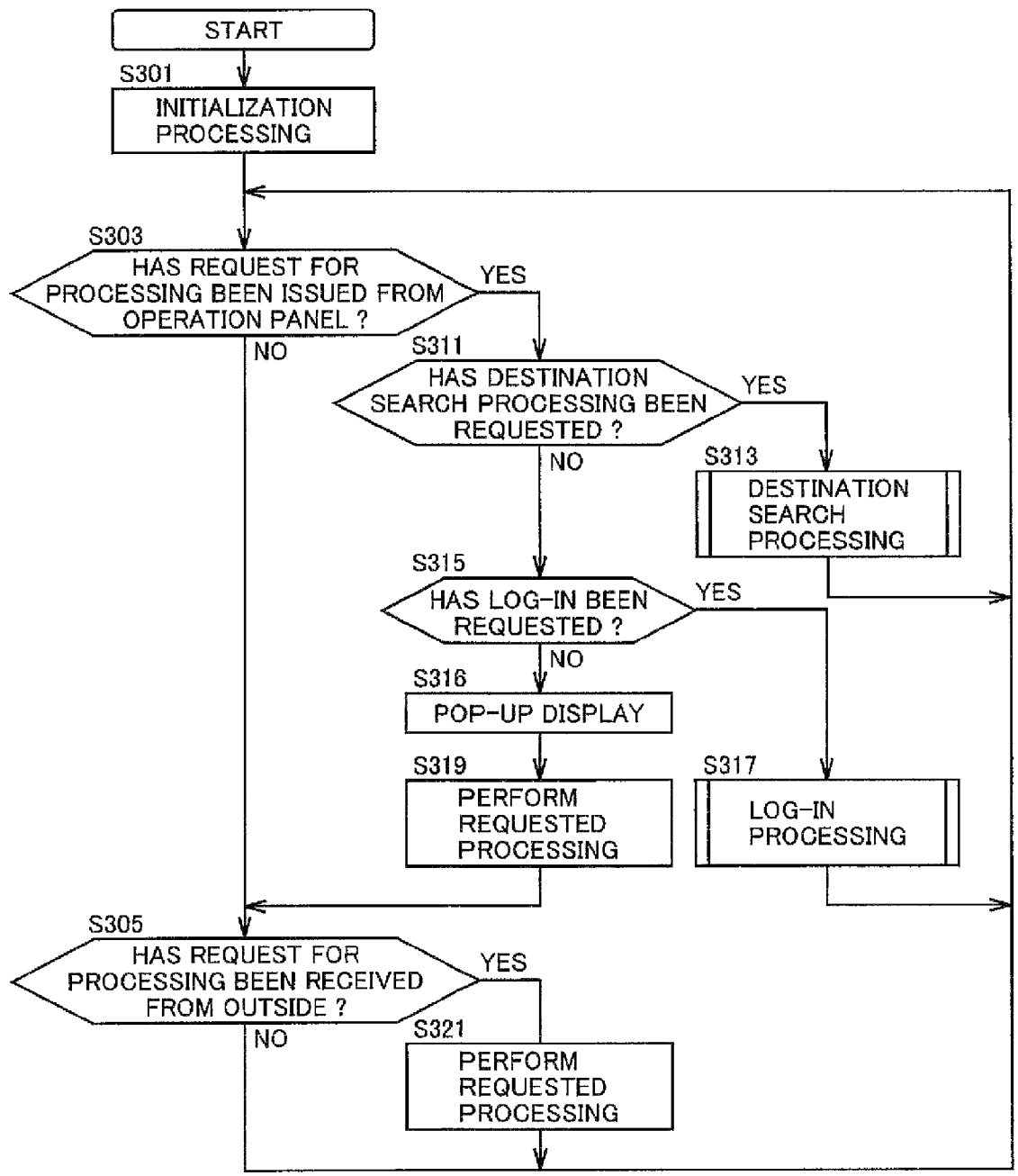
FIG. 4 is a flowchart showing flow of entire processing in the image forming apparatus.

FIG. 4 is a flowchart showing overall flow of processing performed in displaying a window on operation panel 130 of image forming apparatus 1. The processing shown in FIG. 4 is realized by CPU 101 reading and executing a program stored in ROM 102.

It is noted that the flowchart in FIG. 4 exemplifies a case where processing for searching for a destination for document scan transmission or the like (hereinafter also referred to as destination search processing) and log-in processing are defined as processing employing animation display in the display method table. Here, it is assumed that processing other than the destination search processing and the log-in processing is defined as processing employing pop-up display. It is noted that this is merely by way of example and processing other than the destination search processing and the log-in processing may be defined as processing employing animation.

Referring to the figure, in step S301 in which processing is started, CPU 101 performs prescribed initialization processing. Specifically, a setting value of image forming apparatus 1 is set to a predetermined initial value and an initial screen (not shown) based thereon is displayed on operation panel 130.

Thereafter, in S303, CPU 101 determines whether a user's operation has been accepted through operation panel 130 or not. Consequently, when the user's operation has not been accepted (NO in step S303), CPU 101 proceeds to the processing in step S305.

When the user's operation has been accepted through the operation panel (YES in step S303), CPU 101 determines whether the user's operation is a request for destination search processing or not (step S311). Consequently, when the user's operation is the request for destination search processing (YES in step S311), CPU 101 performs in step S313 the destination search processing which will be described later. Then, after the destination search processing ends, the process returns to step S303.

On the other hand, when the user's operation is not the request for destination search processing (NO in step S311), CPU 101 checks whether the user's operation is a request for log-in processing or not (step S315). Consequently, when the user's operation is the request for log-in processing (YES in step S315), CPU 101 performs in step S317 log-in processing which will be described later (step S317). Then, after the log-in processing ends, the process returns to step S303.

When the user's operation is not the request for log-in processing (NO in step S315), CPU 101 provides notification through pop-up display in connection with the processing in accordance with the user's operation accepted in S303 (step S316) and performs the processing in accordance with the user's operation (step S319). Then, after the processing in accordance with the user's operation ended, CPU 101 proceeds to processing in step S305.

CPU 101 determines whether a request for processing has been made from an external apparatus such as information processing apparatus 3 through network 4 or not (step S305). The request for processing from an external apparatus refers to an instruction from the external apparatus to image forming apparatus 1 to perform printing or an instruction to change a setting value. When there is no request for processing from an external apparatus (NO in step S305), CPU 101 returns to the processing in step S303.

On the other hand, when the request for processing has been made from an external apparatus (YES in step S305), CPU 101 performs the processing requested from the external apparatus (step S321). Here, processing performed in step S321 includes, for example, processing for executing a print job corresponding to an instruction to perform printing, processing for changing various settings stored in NV-RAM 104 corresponding to the instruction to change a setting value, and the like. When the processing requested from the external apparatus has ended, CPU 101 returns to the processing in step S303 and repeatedly performs the processing above.

(Destination Search Processing)

Figure 5:
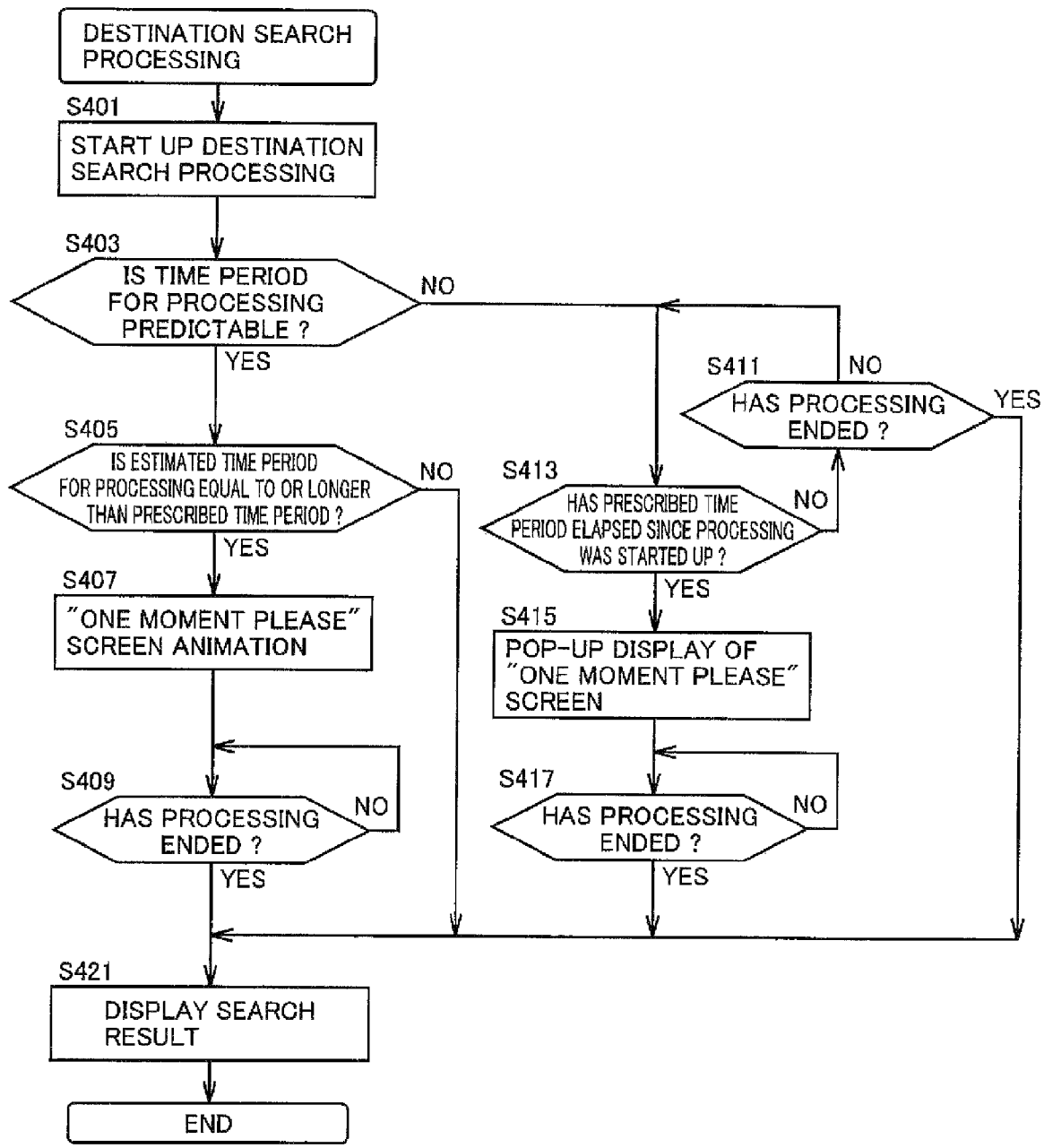
FIG. 5 is a flowchart showing flow of destination search processing in step S313 in FIG. 4.

FIG. 5 is a flowchart showing flow of the destination search processing in step S313 above. The processing in the flowchart shown in FIG. 5 is also realized by CPU 101 reading and executing a program stored in ROM 102. FIGS. 6 to 9 are diagrams each showing a specific example of a screen and a window displayed on operation panel 130 in connection with the destination search processing. The destination search processing in FIG. 5 will be described with reference to FIGS. 6 to 9.

Figure 6:
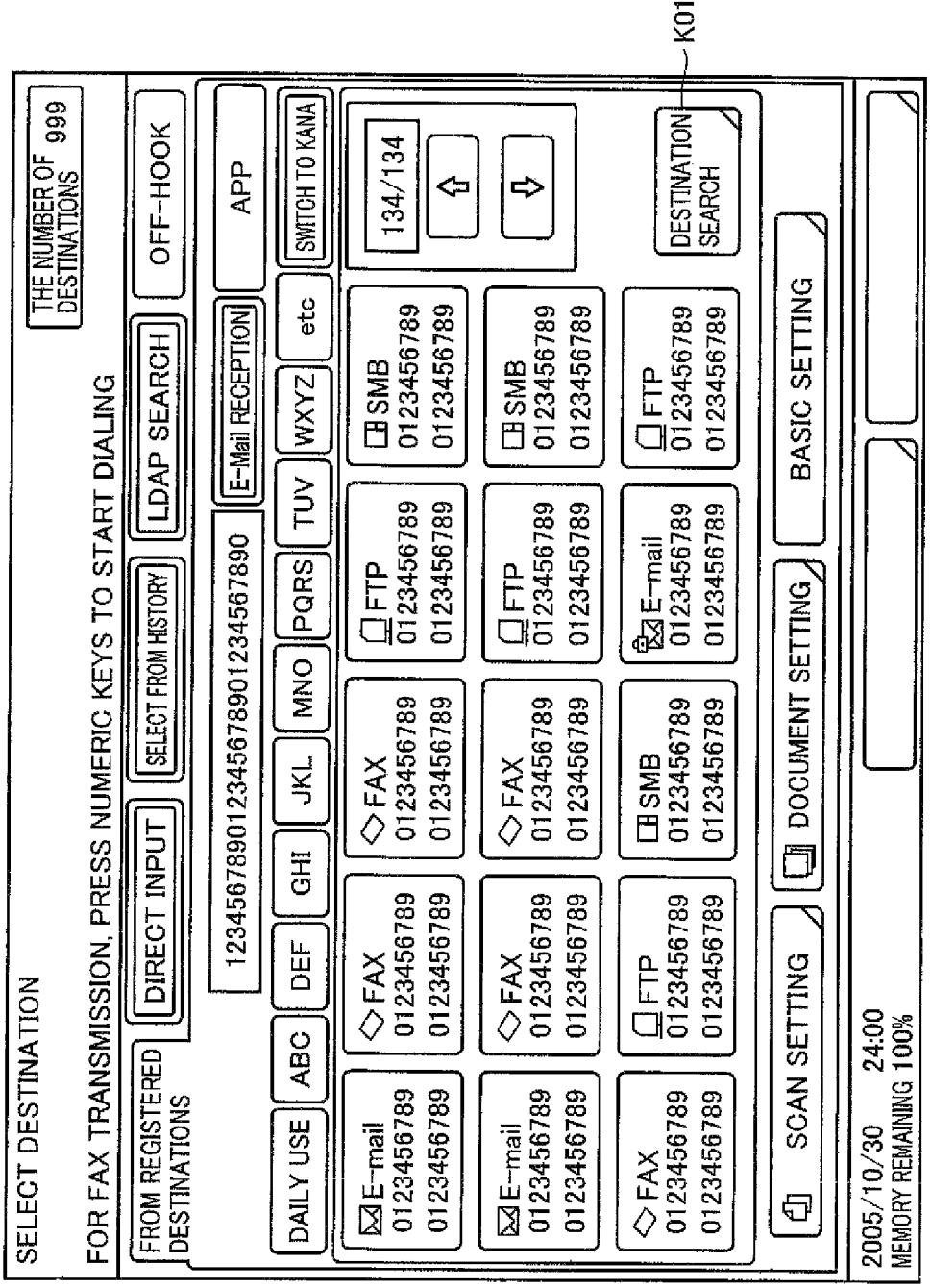
FIG. 6 is a diagram showing a specific example of a screen displaying a list of destinations registered in the image forming apparatus.
Figure 7:
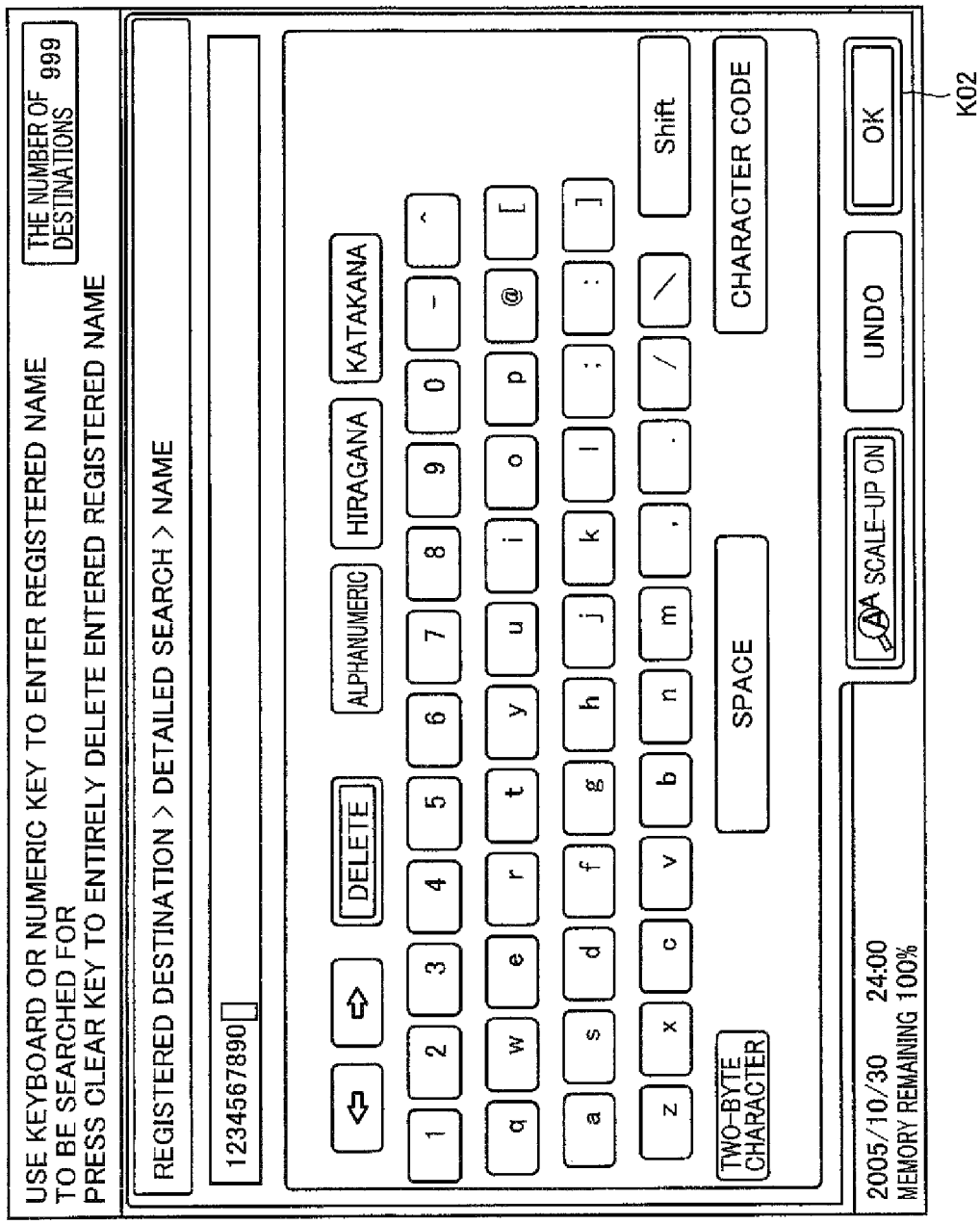
FIG. 7 is a diagram showing a specific example of a screen in which a search keyword is to be entered.

FIG. 6 is a diagram showing a specific example of a screen displaying a list of destinations registered in image forming apparatus 1. FIG. 7 is a diagram showing a specific example of a screen in which a search keyword is to be entered (a screen for indicating search for a destination). When pressing of a "destination search" key K01 is accepted in the screen in FIG. 6, CPU 101 switches display to the screen in FIG. 7. When entry of a search keyword in the screen in FIG. 7 is accepted and pressing of an "OK" key K02 is accepted, CPU 101 starts processing in FIG. 5, assuming that the destination search processing has been requested.

Referring to FIG. 5, CPU 101 starts up in step S401 the destination search processing in response to the request for the destination search processing and determines in step S403 whether the time period required for the destination search processing is predictable or not.

Here, the destination search processing includes two modes of a mode in which an object to be searched for is destination data stored (registered) in image forming apparatus 1 and a mode in which an object to be searched for is destination data registered in an apparatus other than image forming apparatus 1 (for example, information processing apparatus 3). It is noted that the former mode is also referred to as an internal search mode and the latter mode is also referred to as an external search mode.

In performing the destination search processing in the external search mode, image forming apparatus 1 accesses information processing apparatus 3, in which the destination data has been registered, through network 4 and searches for a destination matching the search keyword in the destination data in information processing apparatus 3. The user sets through operation panel 130, in which mode the destination search processing should be performed. CPU 101 writes a mode for the destination search processing in a prescribed area in NV-RAM 104 in accordance with the user setting.

In performing the destination search processing in the internal search mode, the time period required for the destination search processing is dependent on the number of destinations registered in image forming apparatus 1. Then, CPU 101 can recognize the number of destinations registered in the apparatus in which it is contained (the number of registrations) before performing the destination search processing. Therefore, CPU 101 can predict the time period required for the destination search processing based on the number of registrations in image forming apparatus 1.

On the other hand, when the destination search processing is performed in the external search mode, the time period required for the destination search processing is unpredictable, because the time period required for processing in this case is dependent not only on the number of destinations registered in information processing apparatus 3 but also a condition of processing load of information processing apparatus 3 and traffic over network 4.

Then, when the mode for the destination search processing is set to the internal search mode in NV-RAM 104, CPU 101 determines that the time period required for processing is predictable and when it is set to the external search mode, CPU 101 determines that the time period required for processing is unpredictable.

When the time period required for the search processing is predictable, that is, when the internal search mode is set (YES in step S403), CPU 101 further determines whether the predicted time period required for processing is equal to or longer than a first reference time period T1 or not. First reference time period T1 here corresponds to a time period for which the user feels that "he/she is waiting for some time," and for example, to about two seconds. When the number of destinations registered in image forming apparatus 1 is equal to or more than a first reference count C1 (for example, 1000 and the like), CPU 101 determines that the time period required for processing is equal to or longer than first reference time period T1. On the other hand, when the number of registrations in image forming apparatus 1 is smaller than first reference count C1, CPU 101 determines that the time period required for processing is shorter than first reference time period T1.

When the time period required for processing is equal to or longer than first reference time period T1 (YES in step S405), CPU 101 determines that animation display is to be employed for display of the window and performs in step S407 processing for animation display.

Figure 8:
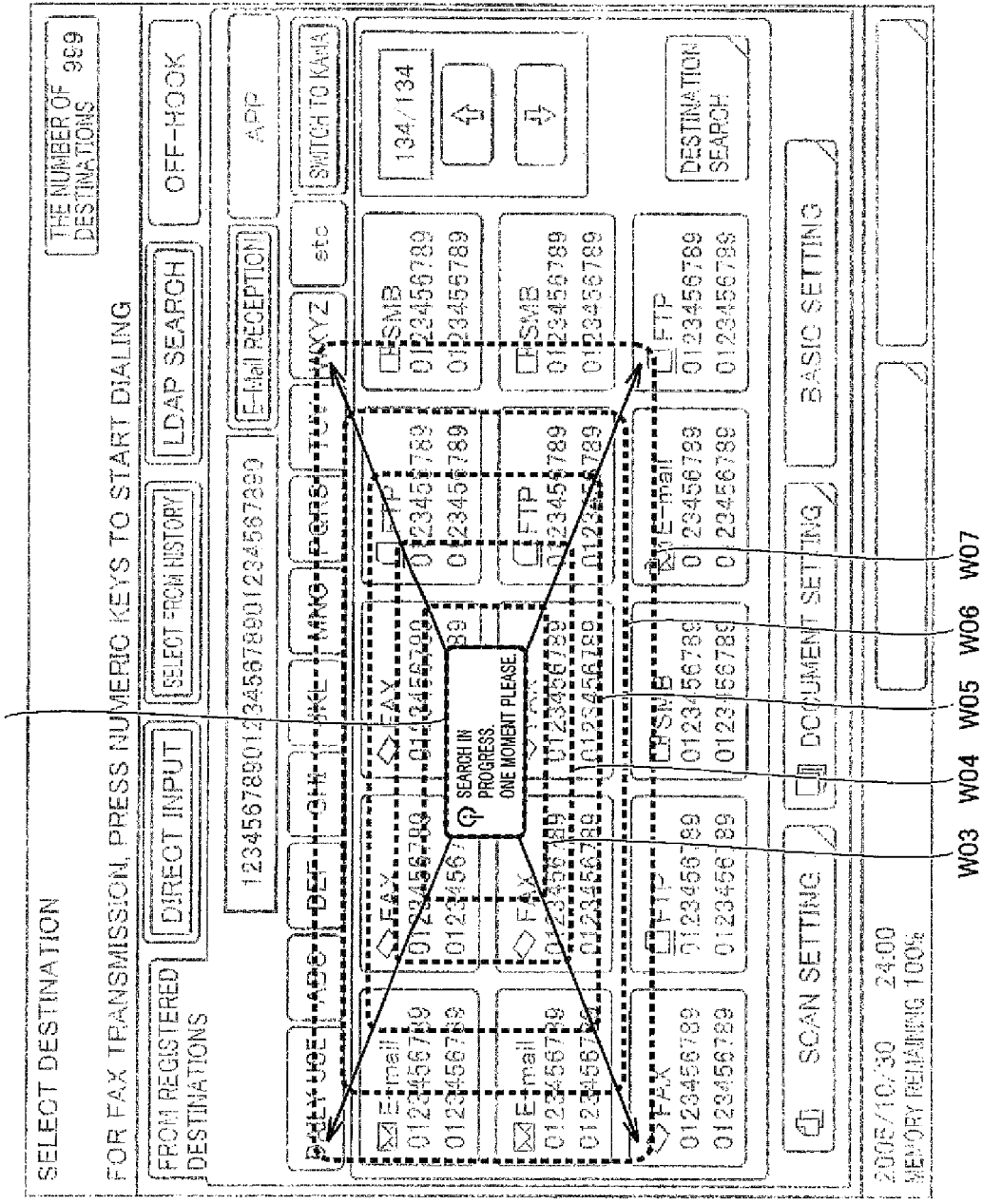
FIG. 8 is a diagram showing a specific example of a screen providing animation display.

FIG. 8 is a diagram illustrating how animation display is provided. As the processing in step S407 is performed, animation display as in FIG. 8 is provided. In FIG. 8, initially, a smallest window W02 is displayed, and in succession, animation display is provided such that the window gradually becomes larger in the order of windows W03→W04→W05→W06→W07. In the example in FIG. 8, a window in which a text "Search in progress. One moment please." is displayed is shown by way of example. In FIG. 8, windows (W02 to W07) in six sizes are displayed sequentially from a smaller one every prescribed time. Image data corresponding to six displayed windows and the order of display of screens are stored in advance in animation processing unit 112. It is noted that, after the finally displayed screen (W07) is displayed, that screen is continuously displayed.

When CPU 101 performs animation processing in step S407, CPU 101 waits until the destination search processing ends (NO in step S409). It is noted that, until the destination search processing ends, the screen finally displayed in animation display (W07 in FIG. 8) is displayed continuously on operation panel 130. On the other hand, when the destination search processing has ended (YES in step S409), the process proceeds to step S421.

When it is determined in step S405 that the predicted required time period is shorter than first reference time period T1 (NO in step S405), CPU 101 skips the processing in step S407 and proceeds to the processing in step S421.

In step S421, CPU 101 causes operation panel 130 to display a screen displaying a list of destinations indicating the retrieved destinations (not shown).

Through the processing so far, when the internal search mode is set and the destination search processing ends within first reference time period T1, a window indicating that search is in progress is not displayed but direct transition from the screen indicating search for a destination (FIG. 7) to the screen showing a result of search (not shown) is made. On the other hand, when the internal search mode is set and the time period required for processing is equal to or longer than first reference time period T1 (for example, two seconds), animation display (FIG. 8) is provided from the screen indicating search for a destination (FIG. 7), and when the destination search processing has ended, transition to the screen showing the result of search (not shown) is made. Thus, the user can predict that it will take some time to perform the destination search processing, and uncomfortable feeling in waiting until the processing ends can be lessened.

Referring back to the flowchart in FIG. 5, when it is determined in step S403 that the time period required for the destination search processing is unpredictable, that is, when the external search mode is set (NO in step S403), CPU 101 waits until a second reference time period T2 elapses since start of the destination search processing (NO in step S413, NO in step S411). Then, when the destination search processing ended before second reference time period T2 elapses since start of the destination search processing (NO in step S413, YES in step S411), the process proceeds to step S421 without providing pop-up display. It is noted that second reference time period T2 may be identical in length to or different in length from first reference time period T1 above.

On the other hand, when it is determined that second reference time period T2 has elapsed since start of the destination search processing (YES in step S413), processing for pop-up display is performed in step S415. FIG. 9 is a diagram showing a specific example of a screen providing pop-up display. As a result of processing in step S415, window W01 is displayed.

In pop-up display (FIG. 9), pop-up display of a window the same as the finally displayed window (W07) among the six types of windows (W02 to 07) in animation display (FIG. 8) is provided.

In the foregoing description, an image data group used in animation display and image data used in pop-up display are stored separately in animation processing unit 112 and pop-up processing unit 113 respectively. Pop-up processing unit 113, however, may not store image data used for pop-up display but may read image data corresponding to the finally displayed window (in the example in FIG. 8, window W07) in the image data group stored in animation processing unit 112 from animation processing unit 112 and provide pop-up display thereof.

Referring back to FIG. 5, when pop-up display has ended in step S415, CPU 101 waits until the destination search processing ends (NO in S417). It is noted that, until the destination search processing ends, the window displayed in pop-up display (W01 in FIG. 9) is continuously displayed on operation panel 130. Then, when it is determined that the destination search processing has ended (YES in step S417), the process proceeds to step S421.

In step S421, CPU 101 causes operation panel 130 to display the screen displaying a list of destinations (not shown) representing the retrieved destinations as described previously.

Through the processing so far, when the external search mode is set and the destination search processing ends within second reference time period T2, the window indicating that search is in progress is not displayed but transition from the screen indicating search for a destination (FIG. 7) to the screen showing the result of search (not shown) is made. On the other hand, when the external search mode is set and the destination search processing does not end even after lapse of second reference time period T2, pop-up display (FIG. 9) is provided from the screen indicating search for a destination (FIG. 7), and when the destination search processing ends, transition to the screen showing the result of search (not shown) is made. Here, when, the external search mode is set, that is, when the time period required for the destination search processing is unpredictable, by using pop-up display rather than animation display, display is not interrupted even though the destination search processing soon ended, and thus user's smooth operational feeling or usability is not impaired.

(Authentication Processing)

Figure 10:
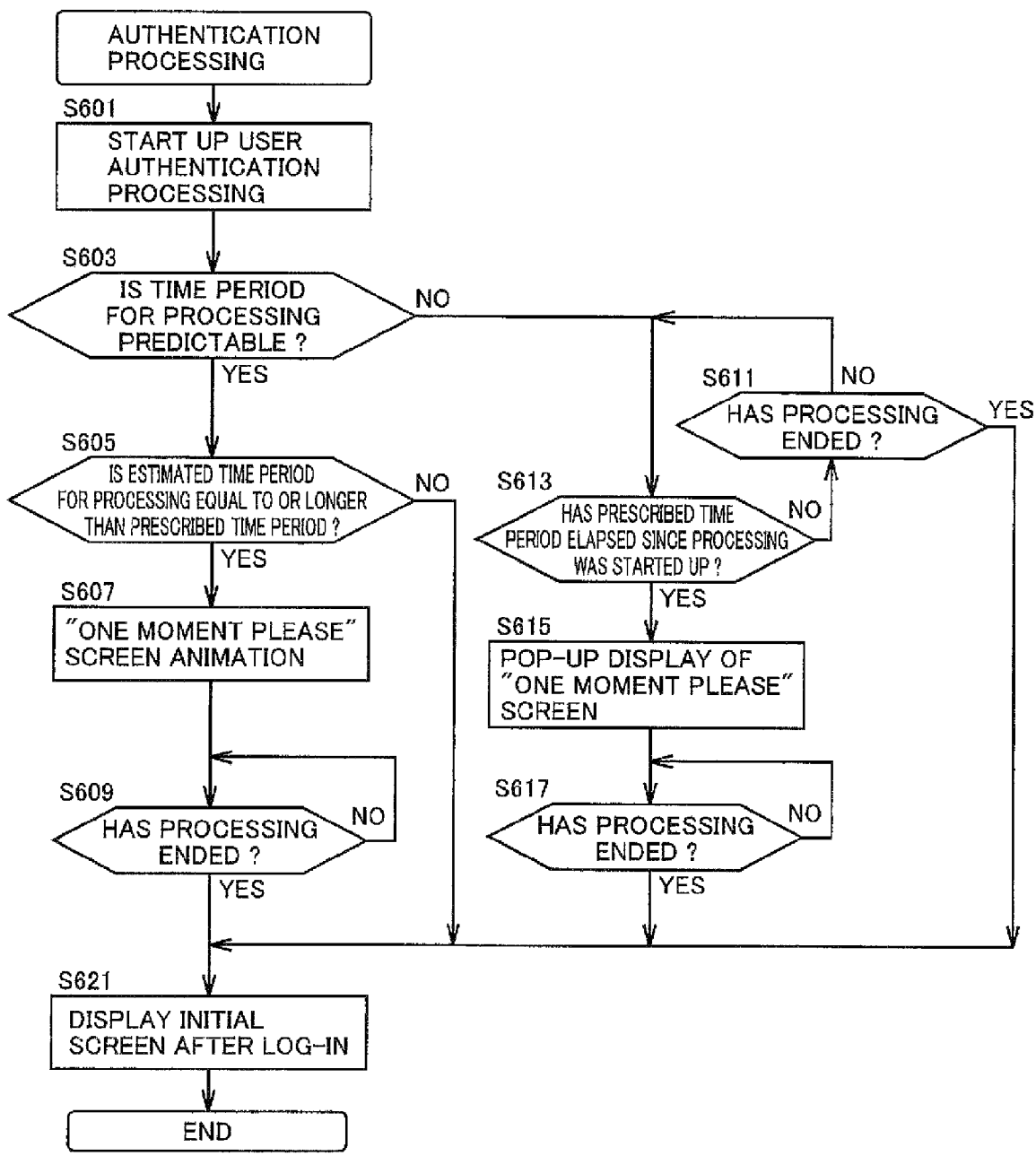
FIG. 10 is a flowchart showing flow of authentication processing in step S317 in FIG. 4.

FIG. 10 is a flowchart showing flow of the authentication processing in step S317 in the flowchart shown in FIG. 4. The processing in the flowchart shown in FIG. 10 is also realized by CPU 101 reading and executing a program stored in ROM 102. FIGS. 11 to 14 are diagrams each showing a specific example of a screen and a window displayed on operation panel 130 in connection with the authentication processing. The authentication processing in FIG. 10 will be described with reference to FIGS. 11 to 14.

Figure 11:
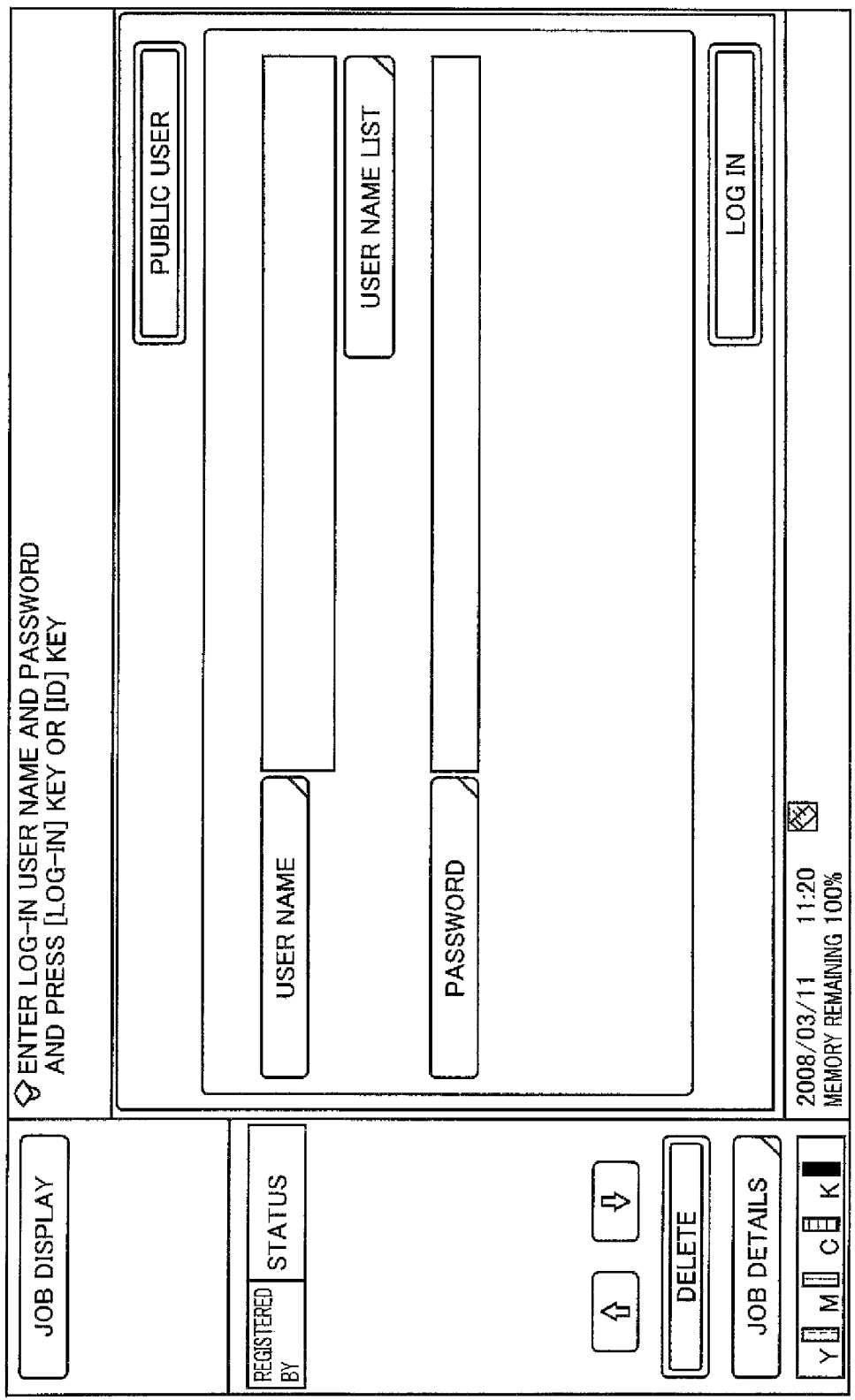
FIG. 11 is a diagram showing a specific example of a log-in screen.

FIG. 11 is a diagram showing a specific example of a log-in screen for authenticating the user's right to use in using image forming apparatus 1. When entry of a "user name" and a "password" is accepted in the screen in FIG. 11 and pressing of a "log-in" key is accepted, CPU 101 starts processing in FIG. 10, assuming that the authentication processing has been requested. It is noted that information used for authentication, such as a "user name" and a "password", is also collectively referred to as log-in information.

Referring to FIG. 10, CPU 101 starts up in step S601 the authentication processing in response to the request for the authentication processing and determines in step S603 whether a time period required for the authentication processing is predictable or not.

Here, authentication of a user's right to use includes two modes of a mode in which an object to be compared with entered log-in information is user information stored (registered) in image forming apparatus 1 and a mode in which it is user information registered in information processing apparatus 3 which registers and manages the user information. It is noted that the former mode is also refereed to as an internal authentication mode and the latter mode is also refereed to as an external authentication mode.

The user sets through operation panel 130, in which mode the authentication processing is to be performed. Then, CPU 101 writes a mode for the authentication processing in a prescribed area in NV-RAM 104 in accordance with the user setting.

In performing the authentication processing in the internal authentication mode, the time period required for the authentication processing is dependent on the number of pieces of user information registered in image forming apparatus 1. Then, CPU 101 can recognize the number of pieces of user information registered in the apparatus in which it is contained (the number of registrations) before performing the authentication processing. Therefore, CPU 101 can predict the time period required for the authentication processing based on the number of registrations in image forming apparatus 1.

On the other hand, when the authentication processing is performed in the external authentication mode, the time period required for the authentication processing is unpredictable, because the time period required for processing in this case is dependent not only on the number of pieces of user information registered in information processing apparatus 3 but also a condition of processing load of information processing apparatus 3 and traffic over network 4.

Then, when the mode for the authentication processing is set to the internal authentication mode in NV-RAM 104, CPU 101 determines that the time period required for processing is predictable and when it is set to the external authentication mode, CPU 101 determines that the time period required for processing is unpredictable.

When the time period required for the authentication processing is predictable, that is, when the internal authentication mode is set (YES in step S603), CPU 101 further checks whether the predicted time period required for processing is equal to or longer than first reference time period T1 or not. First reference time period T1 here corresponds to a time period for which the user feels that "he/she is waiting for some time," and for example, to about two seconds. When the number of pieces of user information registered in image forming apparatus 1 is equal to or more than first reference count C1 (for example, 500 and the like), CPU 101 determines that the time period required for processing is equal to or longer than first reference time period T1. On the other hand, when the number of registrations in image forming apparatus 1 is smaller than first reference count C1, CPU 101 determines that the time period required for processing is shorter than first reference time period T1.

When the time period required for processing is equal to or longer than first reference time period T1 (YES in step S605), CPU 101 determines that animation display is to be employed for display of the window and performs in step S607 processing for animation display.

Figure 12:
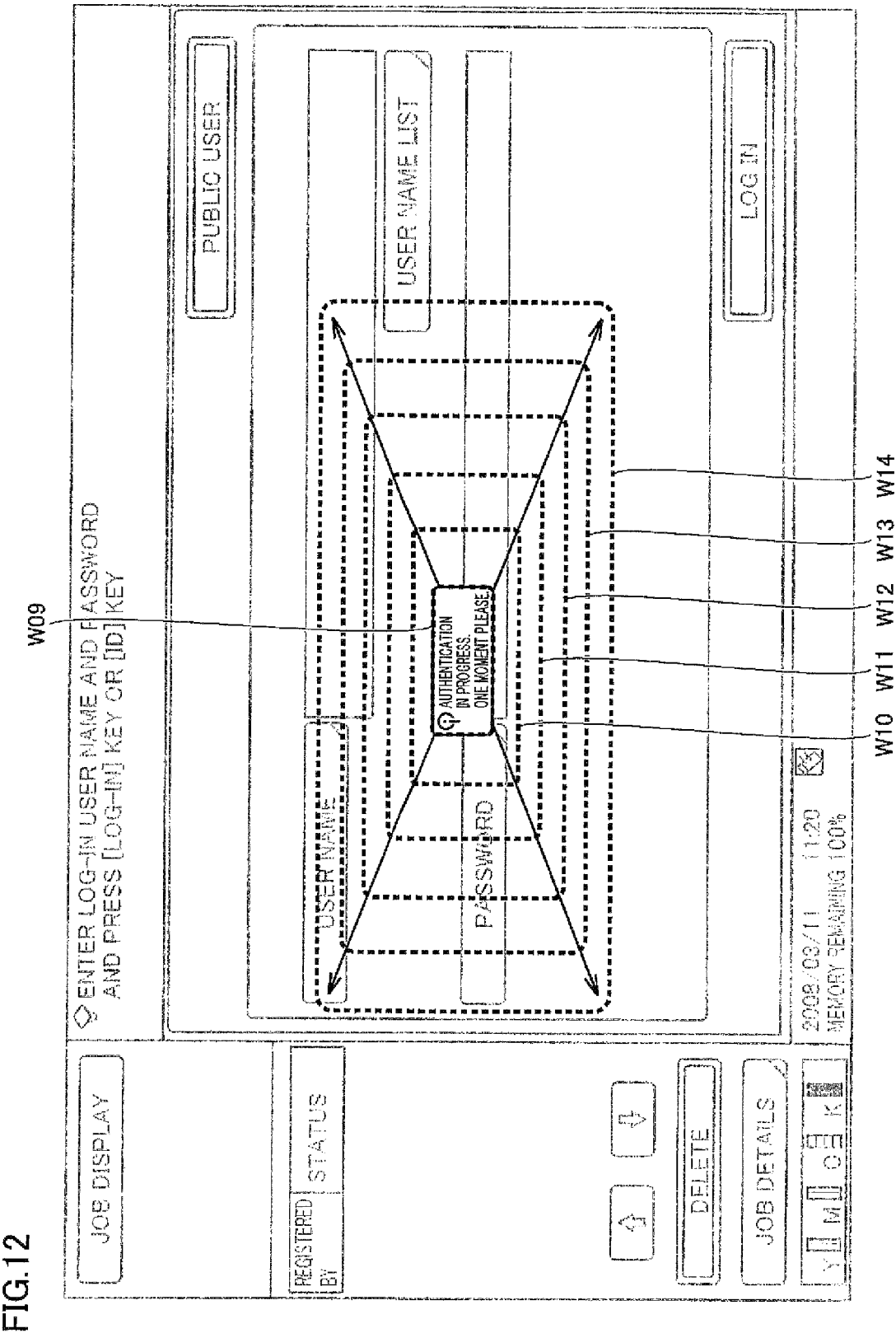
FIG. 12 is a diagram showing a specific example of a screen providing animation display.

FIG. 12 is a diagram illustrating how animation display is provided. As the processing in step S607 is performed, animation display as in FIG. 12 is provided. Namely, in FIG. 12, initially, a smallest window W09 is displayed, and in succession, animation display is provided such that the window gradually becomes larger in the order of windows W10→W11→W12→W13→W14. In the example in FIG. 12, a window in which a text "Authentication in progress. One moment please." is displayed is shown by way of example. In FIG. 12, windows (W09 to W14) in six sizes are displayed sequentially from a smaller one every prescribed time. Image data corresponding to six displayed windows and the order of display of screens are stored in advance in animation processing unit 112. It is noted that, after the finally displayed screen (W14) is displayed, that screen is continuously displayed.

When CPU 101 performs animation processing in step S607, CPU 101 waits until the authentication processing ends (NO in step S609). It is noted that, until the authentication processing ends, the screen finally displayed in animation display (W14 in FIG. 12) is displayed continuously on operation panel 130. On the other hand, when the authentication processing has ended (YES in step S609), the process proceeds to step S621.

When it is determined in step S605 that the predicted required time period is shorter than first reference time period T1 (NO in step S605), CPU 101 skips the processing in step S607 and proceeds to the processing in step S621.

Figure 14:
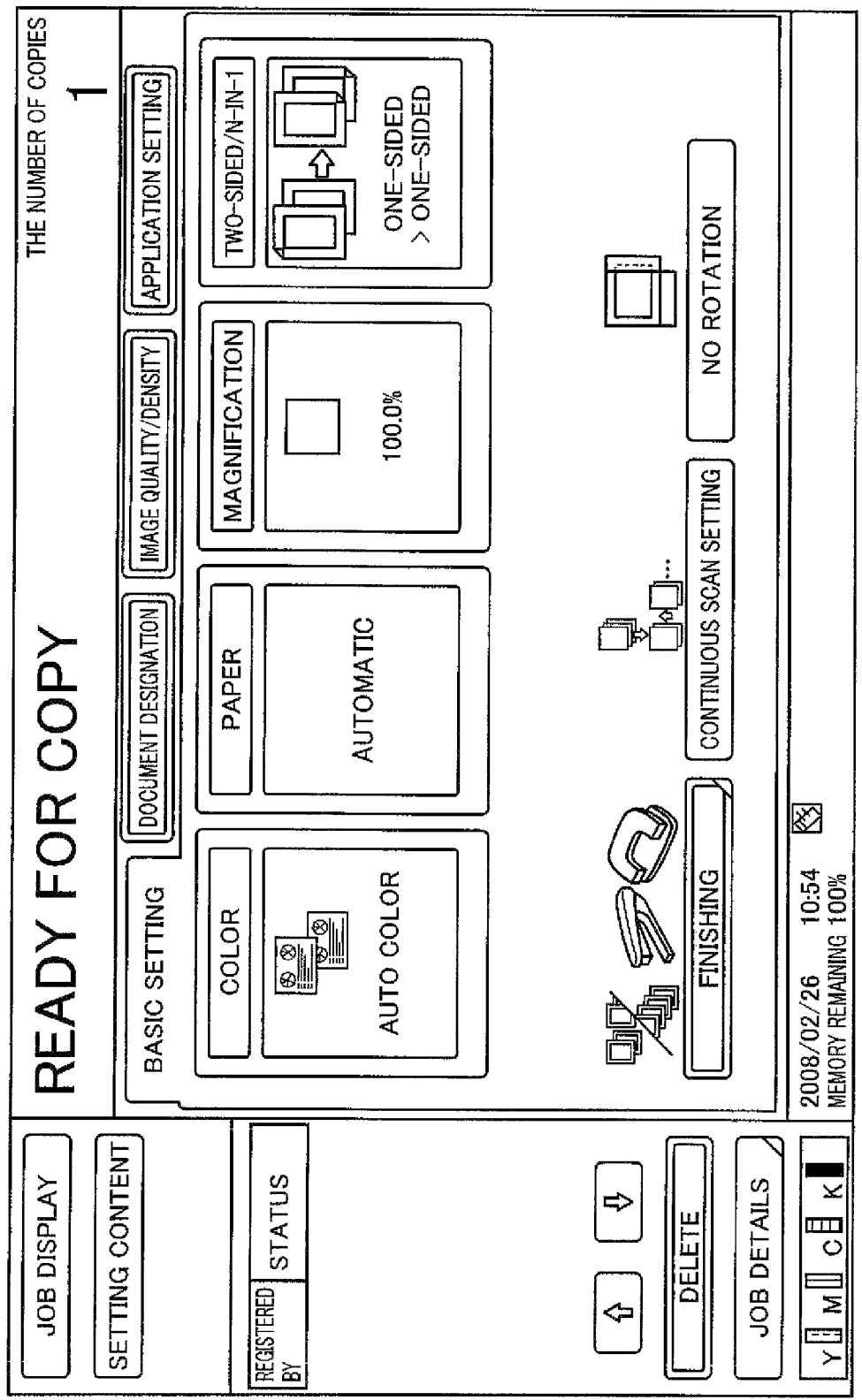
FIG. 14 is a diagram showing a specific example of an initial screen.

In step S621, CPU 101 causes operation panel 130 to display an initial screen after log-in (FIG. 14).

Through the processing so far, when the internal authentication mode is set and the authentication processing ends within first reference time period T1, a window indicating that the authentication processing is in progress is not displayed but direct transition from the log-in screen (FIG. 11) to the initial screen (FIG. 14) is made. On the other hand, when the internal authentication mode is set and the time period required for processing is equal to or longer than first reference time period T1 (for example, two seconds), animation display (FIG. 12) is provided from the log-in screen (FIG. 11), and when the authentication processing ends, transition to the initial screen (FIG. 14) is made. Thus, the user can predict that it will take some time to perform the authentication processing, and uncomfortable feeling in waiting until the processing ends can be lessened.

Referring back to the flowchart in FIG. 10, when it is determined in step S603 that the time period required for the authentication processing is unpredictable, that is, when the external authentication mode is set (NO in step S603), CPU 101 waits until second reference time period T2 elapses since start of the authentication processing (NO in step S613, NO in step S611). Then, when the authentication processing ended before second reference time period T2 elapses since start of the authentication processing (NO in step S613, YES in step S611), the process proceeds to step S621 without providing pop-up display. It is noted that second reference time period T2 may be identical in length to or different in length from first reference time period T1 above.

Figure 13:
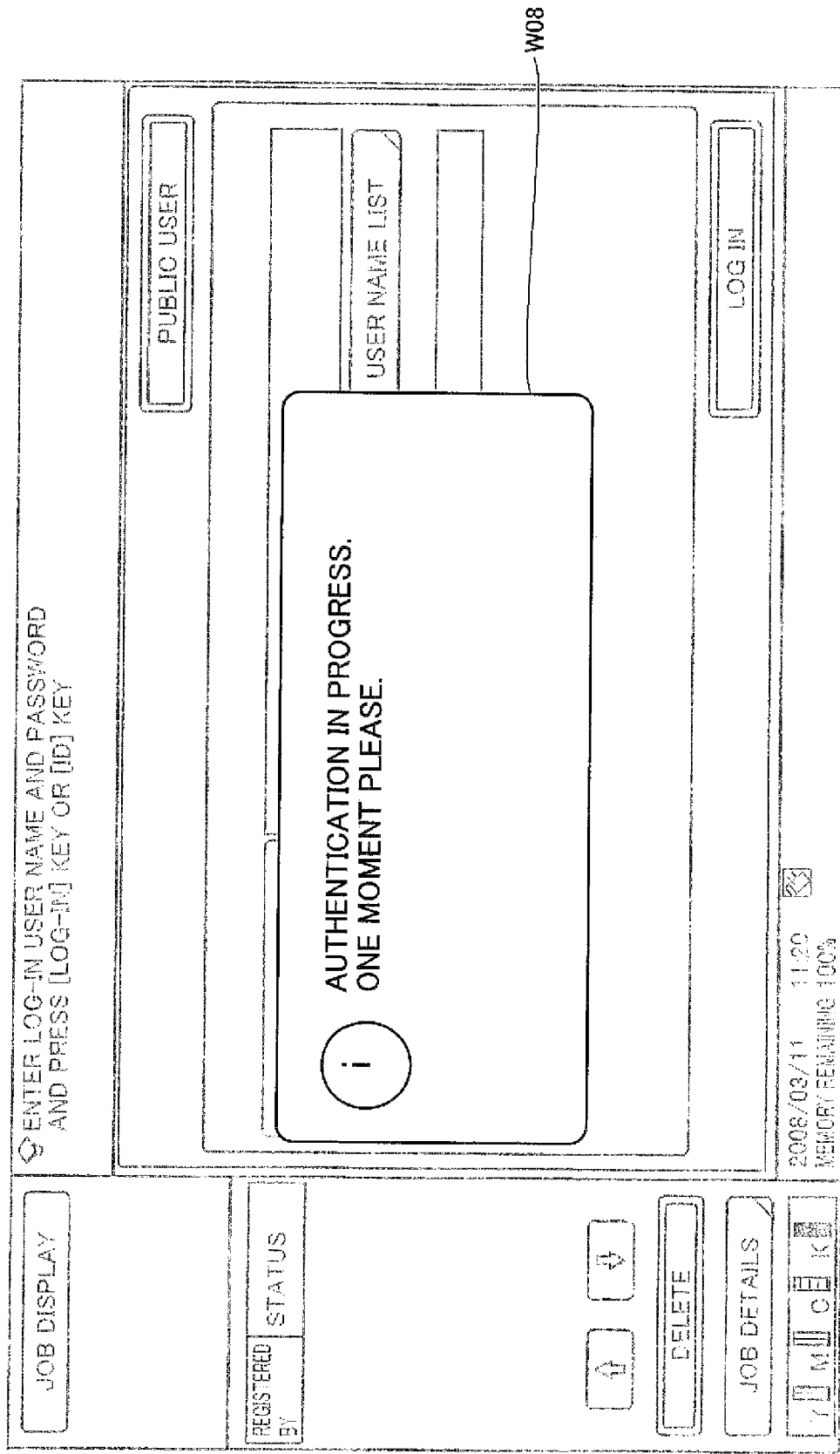
FIG. 13 is a diagram showing a specific example of a screen providing pop-up display.

On the other hand, when it is determined that second reference time period T2 has elapsed since start of the authentication processing (YES in step S613), processing for pop-up display is performed in step S615. FIG. 13 is a diagram showing a specific example of a screen providing pop-up display. As a result of processing in step S615, window W08 is displayed.

In pop-up display (FIG. 13), pop-up display of a window the same as the finally displayed window (W14) among the six types of windows (W09 to 14) in animation display (FIG. 12) is provided.

In the foregoing description, an image data group used in animation display and image data used in pop-up display are stored separately in animation processing unit 112 and pop-up processing unit 113 respectively. Pop-up processing unit 113, however, may not store image data used for pop-up display but may read image data corresponding to the finally displayed window (in the example in FIG. 12, window W14) in the image data group stored in animation processing unit 112 from animation processing unit 112 and provide pop-up display thereof.

Referring back to FIG. 10, when pop-up display has ended in step S615, CPU 101 waits until the authentication processing ends (NO in S617). It is noted that, until the authentication processing ends, the window displayed in pop-up display (W08 in FIG. 13) is continuously displayed on operation panel 130. Then, when it is determined that the authentication processing has ended (YES in step S617), the process proceeds to step S621. In step S621, CPU 101 causes operation panel 130 to display the initial screen (FIG. 14) as described previously.

Through the processing so far, when the external authentication mode is set and the authentication processing ends within second reference time period T2, the window indicating that authentication is in progress is not displayed but transition from the log-in screen (FIG. 11) to the initial screen (FIG. 14) is made. On the other hand, when the external authentication mode is set and the authentication processing does not end even after lapse of second reference time period T2, pop-up display (FIG. 13) is provided from the log-in screen (FIG. 11), and when the authentication processing ends, transition to the initial screen (FIG. 14) is made. Here, when the external authentication mode is set, that is, when the time period required for the authentication processing is unpredictable, by using pop-up display rather than animation display, display is not interrupted even though the authentication processing soon ended, and thus user's smooth operational feeling or usability is not impaired.

<First Variation>

In the embodiment above, in order to provide animation display as in FIG. 8 or 12, it is assumed that a plurality of pieces of image data used by animation processing unit 112 (in the present example, respective pieces of image data of six sizes) are stored.

Animation processing unit 112, however, may be configured to store image data corresponding to at least one size (for instance, in the example in FIG. 8, window W07), perform processing for converting a size of the image data to generate image data corresponding to a window of another size (in the example in FIG. 8, windows W02 to W06), and use the generated image data for animation display.

According to such a configuration, the number of pieces of image data necessary for animation display can be suppressed.

<Second Variation>

In the embodiment above, it is assumed that processing is defined to employ animation display in advance, and when the time period required for processing is determined as predictable and the time period required for processing is equal to or longer than first reference time period T1, animation display is provided.

Then, in providing animation display, referring for example to FIG. 8, a time period from display of first window W02 until display of last window W07, that is, a time period during which a size of the window dynamically changes (hereinafter also referred to as an animation display time period) has always been the same.

The second variation is such that the animation display time period is switched depending on a predicted time period required for processing. This case will be described with reference to the authentication processing by way of example.

The second variation is also the same as the example described previously at least in that processing is defined to provide animation display in advance and when the time period required for processing is determined as predictable (YES in step S603 in the flowchart in FIG. 10), animation display may be provided.

In the present variation, when processing is defined to provide animation display in advance and when the time period required for processing is determined as predictable, two threshold values of a third reference time period T3 and a fourth reference time period T4 are used for determination. It is assumed here that third reference time period T3 is shorter than fourth reference time period T4. Then, display in accordance with a determination result is provided, as shown in (1) to (3) below.

(1) When the time period required for the authentication processing is shorter than third reference time period T3, the initial screen after log-in is displayed without providing animation display.

(2) When the time period required for the authentication processing is equal to or longer than third reference time period T3 and shorter than fourth reference time period T4, animation display shorter than in the embodiment above is provided.

(3) When the time period required for the authentication processing is equal to or longer than fourth reference time period T4, long animation display as in the embodiment above is provided.

In the second variation, animation processing unit 112 stores image data of six sizes as in the embodiment above. When it is determined to provide "long animation display" (in the case of (3) above), CPU 101 provides successive display of windows (W09 to W14 in FIG. 12) based on the image data in six sizes above, to thereby provide animation display in FIG. 12.

Figure 15:
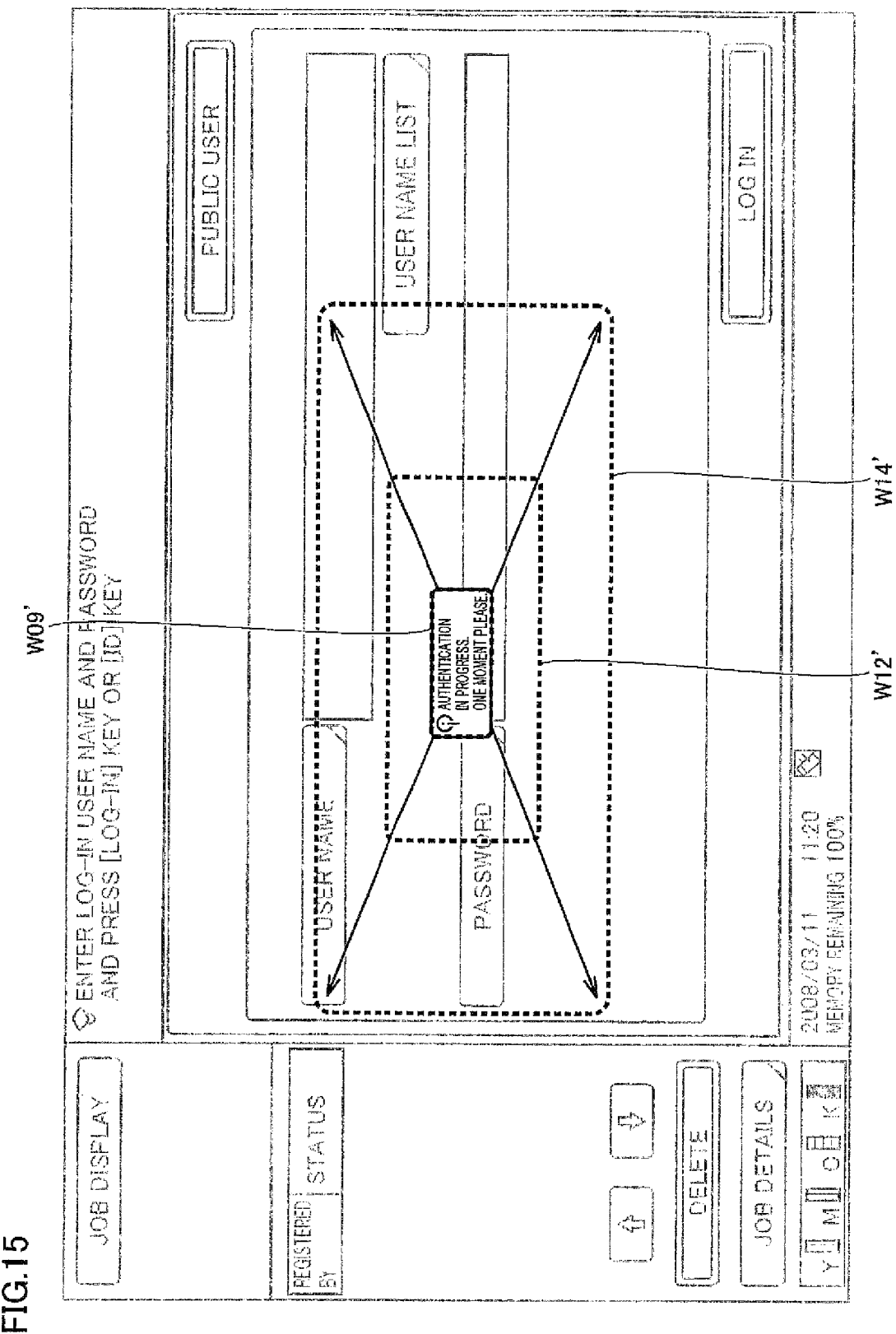
FIG. 15 is a diagram showing a specific example of a screen in which "short animation display" is provided.

On the other hand, when it is determined to provide "short animation display" (in the case of (2) above), CPU 101 extracts a prescribed number of pieces of image data among the image data of six sizes above and provides successive display of windows based on the extracted image data, to thereby provide "short animation display." FIG. 15 is a diagram showing a specific example of a screen in which "short animation display" is provided. In the example in FIG. 15, windows W09', 12', and 14' corresponding to three windows (W09, 12, 14) among the six windows (W09 to W14 in FIG. 12) displayed in long animation are displayed.

In the description above, an example where an animation time period is switched using two threshold values (third reference time period T3 and fourth reference time period T4) has been given, however, the number of threshold values may be increased so that an animation time period is switched in more stages. Namely, a variety of animation display time periods for "short animation display" may be increased to thereby switch between the animation display time periods for "short animation display" in accordance with the time period required for the authentication processing.

According to such a configuration, the user can more accurately predict the time period until the end of the processing through animation display, and uncomfortable feeling in waiting until the processing ends can be lessened.

<Third Variation>

In the example above, in the requested processing, when data necessary for the processing is only stored in image forming apparatus 1 (in the case of the internal search mode), the time period required for processing is determined as predictable, and when data necessary for the processing is stored in another apparatus outside image forming apparatus 1 and access to another apparatus is required in order to obtain the data (in the case of the external search mode), the time period required for processing is determined as unpredictable. As premises, image forming apparatus 1 is assumed to be connected to the network as shown in FIG. 1 and to communicate with another apparatus.

Even though image forming apparatus 1 is not connected to the network, however, similar determination may be made and whether to provide notification of the fact that processing is in progress with animation display or pop-up display may be determined. In this case, when image forming apparatus 1 has a function to read data from such a storage medium as a USB (Universal Serial Bus) memory and data necessary for the processing is stored in the storage medium described above as another apparatus outside image forming apparatus 1, CPU 101 determines that the time period required for processing is unpredictable and that animation display is to be provided.

According to such a configuration, even in an example where image forming apparatus 1 is used as what is called stand-alone, i.e., as not being connected to another apparatus, notification to the effect that processing is in progress can similarly be provided.

Other Examples

In addition, a program for causing image forming apparatus 1 to perform the notification processing described above can also be provided. Such a program can be recorded on a computer-readable recording medium such as a flexible disk, a CD-ROM (Compact Disk-Read Only Memory), a ROM, a RAM (Random Access Memory), and a memory card adapted to a computer, and can be provided as a program product. Alternatively, the program may also be recorded and provided in a recording medium such as a hard disk contained in the computer. Further, the program may also be provided by downloading through the network.

The program according to the present invention may execute the processing by calling a necessary module out of program modules provided as a part of an operating system (OS) of the computer, in a prescribed sequence and at prescribed timing. In such a case, the program itself does not include the module above but executes the processing in cooperation with the OS. Such a program not including the module may also be encompassed in the program according to the present invention.

Alternatively, the program according to the present invention may be provided in a manner incorporated as a part of another program. In such a case as well, the program itself does not include the module included in another program, but the program executes the processing in cooperation with another program. Such a program incorporated in another program may also be encompassed in the program according to the present invention.

The provided program product is installed in a program storage portion such as a hard disk for execution. It is noted that the program product includes the program itself and the recording medium recording the program.

Effects of Embodiments

As such processing is performed in image forming apparatus 1, user's operability is not impaired and display of information on a screen does not impair user's operational feeling or usability. Therefore, smooth and comfortable operation of the image forming apparatus by the user can be achieved.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus, comprising:
   a display apparatus;
   an input apparatus for accepting a request for performing processing; and
   a control device for controlling display on said display apparatus,
   said control device
     performing determination processing for determining whether a time period required for said processing requested to be performed is predictable,
     further performing first display processing for providing animation display by continuously displaying two or more windows relating to said processing requested to be performed on said display apparatus when it is determined in said determination processing that the time period required for said processing requested to be performed is predictable, and
     further performing second display processing for providing pop-up display by displaying one window relating to said processing requested to be performed on said display apparatus when it is determined in said determination processing that the time period required for said processing requested to be performed is not predictable and when said processing requested to be performed does not end after lapse of a first time period since start of said processing requested to be performed.

2. The image forming apparatus according to claim 1, wherein
   said control device performs said first display processing when it is determined in said determination processing that the time period required for said processing requested to be performed is predictable and when the predicted time period required for said processing requested to be performed is longer than a second time period.

3. The image forming apparatus according to claim 1, wherein
   said control device calculates in said determination processing, the time period required for said processing requested to be performed, based on the number of pieces of stored data used for said processing requested to be performed.

4. The image forming apparatus according to claim 1, wherein
   in said determination processing, said control device determines that said time period required is predictable when only data in said image forming apparatus is used in said processing requested to be performed, and determines that said time period required is not predictable when data in another apparatus outside said image forming apparatus is used.

5. An image forming apparatus, comprising:
a display apparatus;
an input apparatus for accepting a request for performing processing; and
a control device for controlling display on said display apparatus,
said control device
performing determination processing for determining whether a time period required for said processing requested to be performed is predictable,
further performing first display processing for providing animation display by continuously displaying two or more windows relating to said processing requested to be performed on said display apparatus when it is determined in said determination processing that the time period required for said processing requested to be performed is predictable, wherein said control device provides animation display for a first time period when the time period required for said processing requested to be performed is equal to or longer than a third time period and provides animation display for a second time period shorter than said first time period when the time period required for said processing requested to be performed is shorter than the third time period, and
further performing second display processing for providing pop-up display by displaying one window relating to said processing requested to be performed on said display apparatus when it is determined in said determination processing that the time period required for said processing requested to be performed is not predictable.

6. A display method in an image forming apparatus including a display apparatus, comprising the steps of:
accepting a request for performing processing;
determining whether a time period required for said processing requested to be performed is predictable;
displaying on said display apparatus, a window relating to said processing requested to be performed in animation display in which two or more windows are continuously displayed when the time period required for said processing requested to be performed is predictable; and
displaying on said display apparatus, a pop-up display in which one window is displayed when said time period required for said processing requested to be performed is not predictable and when said processing requested to be performed does not end after lapse of a first time period since start of said processing requested to be performed.

7. A non-transitory computer-readable recording medium recording a program for causing an image forming apparatus including a display apparatus to perform display processing, said program causing said image forming apparatus to perform the steps of:
accepting a request for performing processing;
determining whether a time period required for said processing requested to be performed is predictable;
displaying on said display apparatus, a window relating to said processing requested to be performed in animation display in which two or more windows are continuously displayed when the time period required for said processing requested to be performed is predictable; and
displaying on said display apparatus, a pop-up display in which one window is displayed when said time period required for said processing requested to be performed is not predictable and when said processing requested to be performed does not end after lapse of a first time period since start of said processing requested to be performed.

8. A display method in an image forming apparatus including a display apparatus, comprising the steps of:
accepting a request for performing processing;
determining whether a time period required for said processing requested to be performed is predictable; and
displaying on said display apparatus, a window relating to said processing requested to be performed in animation display in which two or more windows are continuously displayed when the time period required for said processing requested to be performed is predictable, wherein said displaying provides animation display for a first time period when the time period required for said processing requested to be performed is equal to or longer than a third time period and provides animation display for a second time period shorter than said first time period when the time period required for said processing requested to be performed is shorter than the third time period; and
displaying on said display apparatus, a pop-up display in which one window is displayed when said time period required for said processing requested to be performed is not predictable.

9. A non-transitory computer-readable recording medium recording a program for causing an image forming apparatus including a display apparatus to perform display processing, said program causing said image forming apparatus to perform the steps of:
accepting a request for performing processing;
determining whether a time period required for said processing requested to be performed is predictable; and
displaying on said display apparatus, a window relating to said processing requested to be performed in animation display in which two or more windows are continuously displayed when the time period required for said processing requested to be performed is predictable, wherein said displaying provides animation display for a first time period when the time period required for said processing requested to be performed is equal to or longer than a third time period and provides animation display for a second time period shorter than said first time period when the time period required for said processing requested to be performed is shorter than the third time period; and
displaying on said display apparatus a pop-up display in which one window is displayed when said time period required for said processing requested to be performed is not predictable.

* * * * *